(12) United States Patent
Fromentin et al.

(10) Patent No.: US 11,204,445 B2
(45) Date of Patent: Dec. 21, 2021

(54) OPHTHALMIC LENS COMPRISING AN ENCAPSULATED LIGHT-ABSORBING ADDITIVE

(71) Applicant: ESSILOR INTERNATIONAL, Charenton-le-Pont (FR)

(72) Inventors: Pierre Fromentin, Bangkok (TH); Tipparat Lertwattanaseri, Bangkok (TH); Waranya Phompan, Bangkok (TH); Sanya Hokputsa, Bangkok (TH)

(73) Assignee: Essilor International, Charenton-le-Pont (FR)

( * ) Notice: Subject to any disclaimer, the term of this patent is extended or adjusted under 35 U.S.C. 154(b) by 217 days.

(21) Appl. No.: 16/323,971

(22) PCT Filed: Aug. 9, 2017

(86) PCT No.: PCT/IB2017/001156
§ 371 (c)(1),
(2) Date: Feb. 7, 2019

(87) PCT Pub. No.: WO2018/029540
PCT Pub. Date: Feb. 15, 2018

(65) Prior Publication Data
US 2019/0212473 A1    Jul. 11, 2019

(30) Foreign Application Priority Data

Aug. 9, 2016   (EP) .................................... 16306039

(51) Int. Cl.
*G02B 1/04*   (2006.01)
*B29D 11/00*  (2006.01)
(Continued)

(52) U.S. Cl.
CPC ........ *G02B 1/041* (2013.01); *B29D 11/00009* (2013.01); *C08F 2/44* (2013.01);
(Continued)

(58) Field of Classification Search
CPC ......... G02B 1/041; G02B 1/04; C08F 220/14; C08F 2/44; C08F 120/14; C08F 212/08;
(Continued)

(56) References Cited

U.S. PATENT DOCUMENTS 4,166,043 A   8/1979  Uhlmann et al.
4,273,702 A   6/1981  Leatherman
(Continued)

FOREIGN PATENT DOCUMENTS

CN     103980643      8/2014
WO   WO 2018/029249   2/2018
(Continued)

OTHER PUBLICATIONS

International Preliminary Report on Patentability Issued in Corresponding PCT Patent Application No. PCT/EP2018/081403, dated Jun. 9, 2020.
(Continued)

*Primary Examiner* — Mathieu D Vargot
(74) *Attorney, Agent, or Firm* — Norton Rose Fulbright US LLP

(57) ABSTRACT

The present invention relates to an ophthalmic lens which efficiently absorbs light rays comprising a composition derived from a monomer or oligomer, a catalyst, at least one light-absorbing additive contained in nanoparticles which are dispersed in said monomer or oligomer.

14 Claims, 1 Drawing Sheet

(51) Int. Cl.

| | |
|---|---|
| *C08F 220/14* | (2006.01) |
| *C08K 9/12* | (2006.01) |
| *C08F 2/44* | (2006.01) |
| *C08F 120/14* | (2006.01) |
| *C08F 212/08* | (2006.01) |
| *C08K 3/22* | (2006.01) |
| *C09B 67/08* | (2006.01) |
| *G03C 1/685* | (2006.01) |
| *B82Y 30/00* | (2011.01) |
| *C08K 5/00* | (2006.01) |

(52) U.S. Cl.
CPC .......... *C08F 120/14* (2013.01); *C08F 212/08* (2013.01); *C08F 220/14* (2013.01); *C08K 3/22* (2013.01); *C08K 9/12* (2013.01); *C09B 67/0004* (2013.01); *G02B 1/04* (2013.01); *G03C 1/685* (2013.01); *B82Y 30/00* (2013.01); *C08K 5/005* (2013.01)

(58) Field of Classification Search
CPC ...... C08K 9/12; C08K 3/22; B29D 11/00009; C09B 67/0004; G03C 1/685
See application file for complete search history.

(56) References Cited

U.S. PATENT DOCUMENTS

| | | | |
|---|---|---|---|
| 4,367,170 A | 1/1983 | Uhlmann et al. | |
| 7,261,845 B2 | 8/2007 | Itoh et al. | |
| 9,411,076 B2 | 8/2016 | Slezak et al. | |
| 2004/0207809 A1 | 10/2004 | Blackburn et al. | |
| 2008/0026217 A1 | 1/2008 | Kim et al. | |
| 2010/0113901 A1* | 5/2010 | Zhang | A61B 5/1455 |
| | | | 600/319 |
| 2014/0080972 A1* | 3/2014 | Slezak | G02B 1/04 |
| | | | 524/780 |
| 2016/0297836 A1 | 10/2016 | Koripelly et al. | |

FOREIGN PATENT DOCUMENTS

| | | |
|---|---|---|
| WO | WO 2018/029540 | 2/2018 |
| WO | WO 2019/110264 | 6/2019 |

OTHER PUBLICATIONS

International Search Report and Written Opinion Issued in Corresponding PCT Patent Application No. PCT/EP2018/081403, dated Dec. 10, 2018.

Levinson, et al., https://coolcolors.lbl.gov/LBNL-Pigment-Database/assets/LBNL-commentary/blue+purple.pdf , Feb. 2005.

Gause et al., "Incorporation of ultraviolet (UV) absorbing nanoparticles in contact lenses for Class 1 UV blocking" *Journal of Materials Chemistry B*, 2016, 4(2):327-339.

International Search Report and Written Opinion issued in International Patent Application No. PCT/EP2017/070191, dated Nov. 15, 2017.

International Search Report and Written Opinion issued in International Patent Application No. PCT/IB2017/001156, dated Nov. 20, 2017.

\* cited by examiner

OPHTHALMIC LENS COMPRISING AN ENCAPSULATED LIGHT-ABSORBING ADDITIVE

CROSS-REFERENCE TO RELATED APPLICATIONS

This application is a national phase application under 35 U.S.C. § 371 of International Application No. PCT/IB2017/001156 filed 9 Aug. 2017, which claims priority to European Patent Application No. 16306039.5 filed 9 Aug. 2016. The entire contents of each of the above-referenced disclosures is specifically incorporated by reference herein without disclaimer.

TECHNICAL FIELD

The present invention relates to an ophthalmic lens which efficiently absorbs light rays, comprising a composition derived from a monomer or oligomer, a catalyst, at least one light-absorbing additive contained in nanoparticles which are dispersed in said monomer or oligomer.

BACKGROUND OF THE INVENTION

Light that reaches and enters the human eye is divided into visible light, comprising wavelengths from about 380 to 780 nm, and non-visible light, which includes light in the ultraviolet range (UV-A and UV-B light from about 280 to 380 nm) and the infrared range (Near IR light from about 780 to 1400 nm).

UV light is known to be harmful to the human eye. In particular, it can accelerate ocular ageing which can lead to an early cataract or to more extreme disorders such as photokeratitis or «snow blindness».

Blue light, also known as high-energy visible (HEV) light, corresponds to visible light in the blue-violet band between 380 and 500 nm. Prolonged exposure to blue light emitted from digital devices such as television, laptops, tablets and smartphones and fluorescent and LED lighting is harmful as blue light is able to reach the retina. Some specific ranges of blue light have been shown to cause photoretinitis; digital eyestrain, or computer vision syndrome which includes blurry vision, difficulty focusing, dry and irritated eyes, headaches, neck and back pain; disruption of the circadian rhythm; decreased melanin production; age-related macular degeneration; glaucoma; retinal degenerative diseases; breast and prostate cancer; diabetes; heart disease; obesity and depression. Blue light in the range from about 420 to 450 nm is believed to be especially harmful.

Damages from UV light and blue light can be prevented by incorporating light-absorbing additives in ophthalmic lenses.

Three different methods can be used to prepare light-absorbing ophthalmic lenses. The first method is the impregnation of a polymerized lens in a bath containing a light-absorbing additive as disclosed in European patent N°1 085 349. However, this method adds a step to the production process of the lens, which is not desirable in terms of cost and time.

The second method is the coating of a substance capable of absorbing light rays onto the surface of ophthalmic lenses as disclosed in U.S. Pat. No. 5,949,518. However, the incorporation of high amounts of light-absorbing additives in a coating weakens its mechanical properties.

The third method is the incorporation of a light-absorbing additive in the bulk liquid formulation (i.e. before polymerization) as taught in European patent N°1 085 348. In this document, a thermosetting composition comprising a diethylene glycol bisallylcarbonate or bis(β-epithiopropyl)sulfide monomer, diisopropyl peroxydicarbonate as a catalyst and 2-(2-hydroxy-4-octyloxyphenyl)-benzotriazole as a light-absorbing additive is cast into a mold for lenses and heated until polymerized. However, the lens obtained by this method is prone to undesirable yellowing due to degradation of the light-absorbing additive.

Yellowing of the lens results from interaction between radicals and the light-absorbing additive during polymerization. This yellowing effect is particularly apparent when high concentrations of catalysts are used to initiate polymerization, especially with monomers having weak reactivity such as allyl monomers.

Yellowing of the lens is undesirable for cosmetic reasons and because it can affect the colour perception of the wearer of lenses and eventually lower the transmittance of lenses.

In particular, for lenses absorbing blue light, two yellowing effects may be superposed.

Interaction between radicals and the light-absorbing additive induces yellowing as stated above. For light passing through the lens, a part of blue light is absorbed which results in transmitted light appearing yellowish to the lens wearer.

Yellowing of the lens could be prevented if less catalyst was used but polymerization would not be complete and mechanical properties of the lens would not be acceptable.

Patent application US 20120188503 discloses the use of mild catalysts different from peroxodicarbonates to ensure that absorbing properties of an azaporphyrin dye withstand polymerization process. Among the alternative peroxides proposed, peroxyesters and perketals are particularly preferred.

Patents such as EP2282713, EP2263788 and JP3347140 describe UV absorbers encapsulated in mineral matrixes for cosmetic applications to provide protection against sunburns. However, the high amount of UV-absorbers contained in the nanoparticles and in the cosmetic composition is not compatible with a liquid polymerizable composition for the preparation of an ophthalmic lens.

There is thus a need for an ophthalmic lense that have a predetermined absorption spectrum that is not affected during polymerization.

The Applicant has found that this need could be met by encapsulating a light-absorbing additive in nanoparticles which are dispersed in a thermosetting composition.

SUMMARY OF THE INVENTION

A first object of this invention is an ophthalmic lens comprising a composite substrate comprising:
  A matrix obtained by polymerization of at least one allyl or non-allyl monomer or oligomer in presence of a catalyst for initiating the polymerization of said monomer or oligomer; and
  Nanoparticles containing at least one light absorbing additive, said nanoparticles being dispersed in said matrix wherein:
  The nanoparticles encapsulate a light-absorbing additive.
  Preferably, the light-absorbing additive is not a photochromic dye.

Encapsulating the light-absorbing additive has plenty of advantages. Most importantly, it allows using a variety of compounds which could have interacted in an unsuitable way with the monomers, catalyst and/or additives used to form the matrix. Such unsuitable interactions include solubility issues, degradation, color change and so on.

For instance, encapsulating a sensitive material can prevent it to react with the matrix in case it would otherwise have degraded it.

Mineral particles are a good encapsulation material for water-soluble light-absorbing additives. Indeed, these particles present a good compatibility with aprotic mediums such as monomer. Surface modification enables these particles to be compatible with most media. This allows using water-soluble light-absorbing additives in hydrophobic solvents or matrix.

In some applications such as fluorescence resonance energy transfer (FRET), dyes must be maintained close from each other. FRET is an interesting technique which allows increasing stokes shifts: light absorbed by a first, fluorescent, light-absorbing additive A is reemitted toward a second light-absorbing additive B which can absorb and re-emit the light, thereby inducing a wavelength shift. For this transfer to occur, both light-absorbing additives A and B must be spatially close enough to enable mutual polarization, hence energy transfer. Such short distance can be achieved through very high concentration, which is not compatible with most ophthalmic uses (either in terms of cost, mechanical properties, colour or cosmetic). Encapsulating both agents provides the much needed closeness at a low light-absorbing additive concentration: both agents can be trapped in a single capsule for instance.

The same principle can ensure a local high concentration of antioxidant in the vicinity of a sensitive light-absorbing compound.

Encapsulating the light-absorbing additive may also allow to tune light absorption. Indeed, changes in nanoparticle matrix composition—or in a lesser extent, exposition to annealing conditions—may lead to changes in absorption wavelength of the encapsulated light-absorbing additive, which can allow tuning said absorption wavelength by modifying the matrix appropriately.

Another advantage of encapsulation is that it enhances photostability of most compounds.

Quantum yield of some fluorescent light absorbing additives strongly increases when they are concealed in a nanoparticle. When coupled to photoelectric cells, and to proper optics (waveguides, lenses acting as light concentrator), such effect could allow powering active eyewear systems.

Last but not least, nanoparticles can be considered as a standardization agent: whatever the light absorbing additive encapsulated, the external surface of nanoparticle interacting with the monomer) can be the same, thus enabling the easy introduction of a given light-absorbing additive in a formulation if a similar substrate has already been introduced in a formulation, even with a different light-absorbing additive.

In the present invention, the light-absorbing agent is preferably not a photochromic dye. By "photochromic dye" it is intended to mean a dye which, when activated by UV-A or violet visible light at any wavelength between 315 and 420 nm, is able to darken to such an extent that the visible light transmission factor decreases noticeably. Actually, photochromic dyes have two different molecular configurations. Upon excitation by UV-A or violet visible light, photochromic dyes undergo a molecular change, which requires some flexibility in the matrix in which they are dispersed. It is very difficult to obtain such flexibility in nanoparticles.

Non photochromic light absorbing agents do not change of molecular configuration. Light absorption is associated to energy transitions in molecular orbitals, which are almost not sensitive to the matrix in which they are embedded.

A second object of the present invention is a process for preparing the ophthalmic lens of the invention, comprising the steps of:

a) providing monomers or oligomers from which the matrix can be prepared;
b) preparing nanoparticles encapsulating a light-absorbing additive either in the form of a powder which is dispersible within the monomers or oligomers or in the form of a dispersion of nanoparticles in a liquid which is dispersible within the monomers or oligomers;
c) providing a catalyst for initiating the polymerization of said monomers or oligomers;
d) mixing the monomers or oligomers, the nanoparticles and the catalyst so as to obtain a polymerizable liquid composition in which nanoparticles are dispersed;
e) optionally depositing the polymerizable liquid composition on a substrate;
f) curing the polymerizable liquid composition.

DETAILED DESCRIPTION

The ophthalmic lens of the invention comprises a polymer matrix and nanoparticles which are dispersed therein, wherein the nanoparticles encapsulate a light-absorbing additive.

Preferably, the light-absorbing additive is not a photochromic dye.

The polymer matrix (herein also called "matrix") is obtained by polymerization of at least one allyl or non-allyl monomer or oligomer in presence of a catalyst for initiating the polymerization of said monomer or oligomer.

The polymer matrix and the nanoparticles dispersed therein thus form together a composite substrate, i.e. a composite material having two main surfaces corresponding in the final ophthalmic lens to the front and rear faces thereof.

In one embodiment, the ophthalmic lens consists essentially in the polymer matrix and the nanoparticles dispersed therein.

In another embodiment, the ophthalmic lens comprises an optical substrate on which a coating of the polymer matrix and the nanoparticles dispersed therein is deposited.

The polymer matrix is preferably a transparent matrix.

The polymer matrix can be advantageously chosen from a thermoplastic resin, such as a polyamide, polyimide, polysulfone, polycarbonate, polyethylene terephthalate, poly(methyl(meth)acrylate), cellulose triacetate or copolymers thereof, or is chosen from a thermosetting resin, such as a cyclic olefin copolymer, a homopolymer or copolymer of allyl esters, a homopolymer or copolymer of allyl carbonates of linear or branched aliphatic or aromatic polyols, a homopolymer or copolymer of (meth)acrylic acid and esters thereof, a homopolymer or copolymer of thio(meth)acrylic acid and esters thereof, a homopolymer or copolymer of urethane and thiourethane, a homopolymer or copolymer of epoxy, a homopolymer or copolymer of sulphide, a homopolymer or copolymer of disulphide, a homopolymer or copolymer of episulfide, a homopolymer or copolymer of thiol and isocyanate, and combinations thereof.

The light-absorbing additive is preferably chosen from a colorant, such as a dye or a pigment, a colorless light-absorbing additive or mixtures thereof. Examples of such light absorbing additives are given below.

The molar absorption coefficient of the light-absorbing additive is preferably higher than 5000, at its maximum absorption. Actually, a high molar absorption coefficient is preferable as it enables use of light absorbing agents at very low concentration for a good attenuation performance. As concentration of light absorbing agent in matrix is function of concentration of nanoparticles in matrix and load of nanoparticles in light absorbing agent, a high molar absorption coefficient limits the constraints on nanoparticle load, sometimes difficult to increase and limits the concentration of nanoparticles, which may lead to haze or mechanical weakness of the ophthalmic lens.

In one embodiment, the nanoparticles have a homogeneous composition from inside to outside in which the light-absorbing additive is uniformly distributed. This feature allows an acute control on the optical properties of the overall nanoparticles.

In another embodiment, the nanoparticles have a core containing the light-absorbing additive and a shell surrounding the core. The shell is preferably chosen so as to isolate the core from the matrix. As such, the nature of the shell will preferably be linked to the matrix in which the corresponding particle is meant to be used.

The nanoparticles can present an outer surface which does not comprise any organic compound.

The nanoparticles can comprise a mineral oxide, such as $SiO_2$, $TiO_2$, $ZrO_2$, $Al_2O_3$ or mixtures thereof.

The refractive index of the nanoparticles is preferably from 1.47 to 1.74, as measured according to the ISO 489:1999. More preferably the refractive index of the nanoparticles is identical to the refractive index of the polymer matrix. Indeed, the closer both refractive indexes are, the lesser the impact of the nanoparticles on the overall transmission of the composition.

The size of the nanoparticles is preferably from 1 nm to 10 μm, more preferably from 10 nm to 5 μm, as measured according to the Dynamic Light Scattering method.

The amount of light-absorbing additive in the nanoparticles can be from 0.0001 to 90 wt %, in particular 0.01 to 50% wt %, more particularly 0.1 to 10 wt % based on the total weight of the nanoparticles.

The amount of nanoparticles in the polymer matrix can be from 0.01 to 2 wt %, preferably 0.05 to 1 wt % based on the weight of the polymer matrix.

The polymerizable liquid composition used for generating the aforesaid matrix—hereinafter referred to as "the polymerizable composition"—of the invention comprises a monomer or oligomer, a catalyst, and nanoparticles containing a light-absorbing additive. Said monomer or oligomer can be either an allyl or a non-allyl compound.

The allyl monomer or allyl oligomer included in the composition according to the present invention is a compound comprising an allyl group.

Examples of suitable allyl compound include diethylene glycol bis(allyl carbonate), ethylene glycol bis(allyl carbonate), oligomers of diethylene glycol bis(allyl carbonate), oligomers of ethylene glycol bis(allyl carbonate), bisphenol A bis(allyl carbonate), diallylphthalates such as diallyl phthalate, diallyl isophthalate and diallyl terephthalate, and mixtures thereof.

Examples of suitable non-allyl compound include thermosetting materials known as acrylic monomers having acrylic or methacrylic groups. (Meth)acrylates may be monofunctional (meth)acrylates or multifunctional (meth)acrylates bearing from 2 to 6 (meth)acrylic groups or mixtures thereof. Without limitation, (meth)acrylate monomers are selected from:
 alkyl (meth)acrylates, in particular
  (meth)acrylates derived from adamantine, norbornene, isobornene, cyclopentadiene or dicyclopentadiene,
  C1-C4 alkyl (meth)acrylates such as methyl (meth) acrylate and ethyl (meth)acrylate,
 aromatic (meth)acrylates such as benzyl (meth)acrylate, phenoxy (meth)acrylates or fluorene (meth)acrylates
 (meth)acrylates derived from bisphenol, especially bisphenol-A
 polyalkoxylated aromatic (meth)acrylates such as the polyethoxylated bisphenolate di(meth)acrylates, polyethoxylated phenol (meth)acrylates,
 polythio(meth)acrylates,
 product of esterification of alkyl (meth)acrylic acids with polyols or epoxies,
 and mixtures thereof.

(Meth)acrylates may be further functionalized, especially with halogen substituents, epoxy, thioepoxy, hydroxyl, thiol, sulphide, carbonate, urethane or isocyanate function.

Other examples of suitable non allyl compound include thermosetting materials used to prepare polyurethane or polythiourethane matrix, i.e. mixture of monomer or oligomer having at least two isocyanate function with monomer or oligomer having at least two alcohol, thiol or epithio function.

Monomer or oligomer having at least two isocyanate function may be selected from symmetric aromatic diisocyanate such as 2,2' Methylene diphenyl diisocyanate (2,2' MDI), 4,4' dibenzyl diisocyanate (4,4' DBDI), 2,6 toluene diisocyanate (2,6 TDI), xylylene diisocyanate (XDI), 4,4' Methylene diphenyl diisocyanate (4,4' MDI) or asymmetric aromatic diisocyanate such as 2,4' Methylene diphenyl diisocyanate (2,4' MDI), 2,4' dibenzyl diisocyanate (2,4' DBDI), 2,4 toluene diisocyanate (2,4 TDI) or alicyclic diisocyanates such as Isophorone diisocyanate (IPDI), 2, 5 (or 2, 6)-bis(iso-cyanatomethyl)-Bicyclo[2.2.1]heptane (NDI) or 4,4' Diisocyanato-methylenedicyclohexane (H12MDI) or aliphatic diisocyanates such as hexamethylene diisocyanate (HDI) or mixtures thereof.

Monomer or oligomer having thiol function may be selected from Pentaerythritol tetrakis mercaptopropionate, Pentaerythritol tetrakis mercaptoacetate, 4-Mercaptomethyl-3,6-dithia-1,8-octanedithiol, 4-mercaptomethyl-1,8-dimercapto-3,6-dithiaoctane, 2,5-dimercaptomethyl-1,4-dithiane, 2,5-bis[(2-mercaptoethyl)thiomethyl]-1,4-dithiane, 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane and mixture thereof.

Monomer or oligomer having epithio function may be selected from bis(2,3-epithiopropyl)sulfide, bis(2,3-epithiopropyl)disulfide and bis[4-(beta epithiopropylthio)phenyl] sulfide, bis[4-(beta-epithiopropyloxy)cyclohexyl]sulfide The polymerizable liquid composition used for generating the aforesaid matrix comprises:
 a) at least one monomer or oligomer,
 b) at least one catalyst for initiating the polymerization of said monomer or oligomer,
 c) at least one light-absorbing additive contained in nanoparticles which are dispersed in said monomer or oligomer.

If the monomer or oligomer is of allyl type, the amount of said allyl monomer or oligomer in the polymerizable composition used for generating the matrix according to the present invention may be from 20 to 99% by weight, in particular from 50 to 99% by weight, more particularly from 80 to 98% by weight, even more particularly from 90 to 97% by weight, based on the total weight of the composition. In particular, the polymerizable composition used for generating the matrix may comprise from 20 to 99% by weight, in particular 50 to 99% by weight, more particularly from 80 to 98% by weight, even more particularly from 90 to 97% by weight, based on the total weight of the composition, of diethylene glycol bis(allyl carbonate), oligomers of diethylene glycol bis(allyl carbonate) or mixtures thereof.

According to a particular embodiment, the catalyst is diisopropyl peroxydicarbonate (IPP).

The amount of catalyst in the polymerizable composition according to the present invention may be from 1.0 to 5.0% by weight, in particular from 2.5 to 4.5% by weight, more particularly from 3.0 to 4.0% by weight, based on the total weight of the composition.

The polymerizable composition used for generating the matrix may also comprise a second monomer or oligomer that is capable of polymerizing with the allyl monomer or oligomer described above. Examples of a suitable second monomer include: aromatic vinyl compounds such as styrene, [alpha]-methylstyrene, vinyltoluene, chlorostyrene, chloromethylstyrene and divinylbenzene; alkyl mono(meth)acrylates such as methyl (meth)acrylate, n-butyl (meth)acrylate, n-hexyl (meth)acrylate, cyclohexyl (meth)acrylate, 2-ethylhexyl (meth)acrylate, methoxydiethylene glycol (meth)acrylate, methoxypolyethylene glycol (meth)acrylate, 3-chloro-2-hydroxypropyl (meth)acrylate, stearyl (meth)acrylate, lauryl (meth)acrylate, phenyl (meth)acrylate, glycidyl (meth)acrylate and benzyl (meth)acrylate, 2-hydroxyethyl (meth)acrylate, 2-hydroxypropyl (meth)acrylate, 3-hydroxypropyl (meth)acrylate, 3-phenoxy-2-hydroxypropyl (meth)acrylate and 4-hydroxybutyl (meth)acrylate; di(meth)acrylates such as ethylene glycol di(meth)acrylate, diethylene glycol di(meth)acrylate, triethylene glycol di(meth)acrylate, polyethylene glycol di(meth)acrylate, 1,3-butylene glycol di(meth)acrylate, 1,6-hexanediol di(meth)acrylate, neopentyl glycol di(meth)acrylate, polypropylene glycol di(meth)acrylate, 2-hydroxy-1,3-di(meth)acryloxypropane, 2,2-bis[4-((meth)acryloxyethoxy)phenyl]propane, 2,2-bis[4-((meth)acryloxydiethoxy)phenyl]propane and 2,2-bis[4-((meth)-acryloxypolyethoxy)phenyl]propane; tri(meth)acrylates such as trimethylolpropane tri(meth)acrylate and tetramethylolmethane tri(meth)acrylate; tetra(meth)acrylates such as tetramethylolmethane tetra(meth)acrylate. These monomers may be used singly or in combination of two or more. In the above description, "(meth)acrylate" means "methacrylate" or "acrylate", and "(meth)acryloxy" means "methacryloxy" or "acryloxy".

The amount of the second monomer or oligomer in the polymerizable composition used for generating the matrix according to the present invention may be from 1 to 80% by weight, in particular from 1 to 50% by weight, more particularly from 2 to 20% by weight, even more particularly from 3 to 10% by weight, based on the total weight of the composition.

If the monomer or oligomer is of (meth)acrylic type, the amount of said (meth)acrylic monomer or oligomer in the polymerizable composition used for generating the matrix according to the present invention is from 20 to 99%, in particular from 50 to 99% by weight, more particularly from 80 to 98%, even more particularly from 90 to 97% by weight, based on the total weight of the composition.

Examples of monomer of (meth)acrylic are alkyl mono (meth)acrylates, di(meth)acrylates, tri(meth)acrylates or tetra(meth)acrylates, as defined above. These monomers may be used singly or in combination of two or more.

The polymerizable composition used for generating the matrix may also comprise a second monomer or oligomer that is capable of polymerizing with the (meth)acrylic monomer or oligomer described above. Examples of a suitable second monomer include: aromatic vinyl compounds such as styrene. These monomers may be used singly or in combination of two or more.

The amount of the second monomer or oligomer in the polymerizable composition used for generating the matrix according to the present invention may be from 1 to 80% by weight, in particular from 1 to 50% by weight, more particularly from 2 to 20% by weight, even more particularly from 3 to 10% by weight, based on the total weight of the composition.

If the matrix according to the invention is of polyurethane or polythiourethane type, the monomer or oligomer having at least two isocyanate function and monomer or oligomer having at least two alcohol, thiol or epithio function are preferably selected in a stoichiometric ratio, so as to obtain a complete reaction of all polymerizable functions.

The catalyst included in the composition according to the present invention is a catalyst that is suitable for initiating the monomer polymerization, such as for example an organic peroxide, an organic azo compound, an organotin compound, and mixtures thereof.

Examples of a suitable organic peroxide include dialkyl peroxides, such as diisopropyl peroxide and di-t-butyl peroxide; ketone peroxides such as methyl ethyl ketone peroxide, methyl isopropyl ketone peroxide, acetylacetone peroxide, methyl isobutyl ketone peroxide and cyclohexane peroxide; peroxydicarbonates such as diisopropyl peroxydicarbonate, bis(4-t-butylcyclohexyl) peroxydicarbonate, di-sec-butyl peroxydicarbonate and isopropyl-sec-butylperoxydicarbonate; peroxyesters such as t-butyl peroxy-2-ethylhexanoate and t-hexyl peroxy-2-ethylhexanoate; diacyl peroxides such as benzoyl peroxide, acetyl peroxide and lauroyl peroxide; peroxyketals such as 2,2-di(tert-butylperoxy)butane, 1,1-di(tert-butylperoxy)cyclohexane and 1,1-bis(tert-butylperoxy)3,3,5-trimethylcyclohexane; and mixtures thereof.

Examples of a suitable organic azo compound include 2,2'-azobisisobutyronitrile, dimethyl 2,2'-azobis(2-methylpropionate), 2,2'-azobis(2-methylbutyronitrile), 2,2'-azobis(2,4-dimethylvaleronitrile), 4,4'-azobis(4-cyanopentanoic acid), and mixtures thereof.

Examples of a suitable organotin compound are dimethyltin chloride, dibutyltin chloride, and mixtures thereof.

The light-absorbing additive that is contained in nanoparticles dispersed in the composition according to the present invention is preferably a compound that is capable of absorbing ultraviolet, visible and/or near infrared light.

In particular, the light-absorbing additive may be selected from the group consisting of a colorant, such as a dye or a pigment; a colorless light-absorbing additive; and mixtures thereof. Suitable examples of dyes, pigments and colorants are compounds belonging to the azo or rhodamine or cyanine or polymethine or merocyanine or fluorescein or pyrylium or porphyrin or phthalocyanine or perylene or coumarin or acridine or indolenin or indol-2-ylidene or benzanthrone or anthrapyrimidine or anthrapyridone or benzotriazole or benzophenone or anthraquinone or triazine or oxalanilide families; metal-complexes such as a rare-earth cryptates or chelates; aluminates, silicates and aluminosilicates.

In a specific embodiment, the colorants and colorless light-absorbing additives are blue light-absorbers, i.e. they absorb visible light in the blue-violet band between 380 and 500 nm. This absorption may be specific, with a selective absorber having an absorption peak in the band between 380 and 500 nm. This absorption may be also non specific, but linked to side effect of a broad band of absorption of a UV absorber.

When the light-absorbing additive is a blue light-absorber, the resulting ophthalmic lens may be characterized with mean light transmittance over a specific range of blue light, in particular over the range of 420 nm to 450 nm. Preferably, the blue light absorber is chosen so that the ophthalmic lens obtained from the polymerizable composition of the present invention has mean light transmission in the range of 420 nm to 450 nm (hereafter TB %) lower than 85%, more preferably lower than 75%.

According to a particular embodiment, the blue light-absorber included in the composition according to the present invention is a metallo porphyrin, in particular a hydrophobic metallo porphyrin.

According to another embodiment, the blue light-absorber included in the composition according to the present invention is Auramine O; Coumarin 343; Coumarin 314; Proflavin; Nitrobenzoxadiazole; *Lucifer* yellow CH; 9,10 Bis(phenylethynyl)anthracene; Chlorophyll a; Chlorophyll b; 4-(Dicyanomethylene)-2-methyl-6-(4-dimethylaminostyryl)-4H-pyran; 2-[4-(Dimethylamino)styryl]-1-methypyridinium iodide, 3,3'-Diethyloxacarbocyanine iodide, lutein, zeaxanthin, beta-carotene or lycopene or perylene; and mixtures thereof.

According to another embodiment, the blue light-absorber included in the composition according to the present invention is a porphyrin or a derivative thereof. Some examples of porphyrins include 5,10,15,20-Tetrakis(4-sulfonatophenyl)porphyrin sodium salt complex; 5,10,15,20-Tetrakis(N-alkyl-4-pyridyl)porphyrin complex; 5,10,15,20-Tetrakis(N-alkyl-3-pyridyl)porphyrin metal complex, and 5,10,15,20-Tetrakis(N-alkyl-2-pyridyl)porphyrin complex, and mixtures thereof, wherein the alkyl is selected from methyl, ethyl, butyl and/or propyl. All these porphyrins show very good water solubility and are stable up to 300° C. Other examples of porphyrins include diprotonated tetraphenylporphyrin, magnesium octaethylporphyrin, magnesium tetramesitylporphyrin, tetrakis(2,6-dichlorophenyl)porphyrin, tetrakis(o-aminophenyl)porphyrin, tetramesitylporphyrin, zinc tetramesitylporphyrin, zinc tetraphenylporphyrin, Mg(II) meso-Tetra(4-sulfonatophenyl)porphine tetrasodium salt, manganese(III) 5,10,15,20-tetra(4-pyridyl)-21H,23H-porphyrin chloride tetrakis(methochloride), 5,10,15,20-Tetrakis(4-sulfonatophenyl)-21H,23H-porphine manganese (III) chloride, 5,10,15,20-Tetrakis(4-sulfonatophenyl)-porphine-Cu(II), 2,3,7,8,12,13,17,18-Octaethyl-21H,23H-porphine manganese(III) chloride, zinc 5,10,15,20-tetra(4-pyridyl)-21H,23H-porphine tetrakis(methochloride), 5,10,15,20-Tetrakis(4-methoxyphenyl)-21H,23H-porphine cobalt(II), 5,10,15,20-Tetrakis(4-methoxyphenyl)-21H,23H-porphine, 5,10,15,20-Tetrakis(4-methoxyphenyl)-21H,23H-porphine iron (II) chloride, zinc 5,10,15,20-tetra(4-pyridyl)-21H,23H-porphine tetrakis(methochloride), 5,10,15,20-Tetrakis(1-methyl-4-pyridinio)porphyrin tetra(p-toluenesulfonate), 5,10,15,20-Tetrakis(4-hydroxyphenyl)-21H,23H-porphine, 4,4',4'',4'''-(Porphine-5,10,15,20-tetrayl)tetrakis(benzoic acid).

According to another embodiment, the blue light-absorber included in the composition according to the present invention is a metal complex wherein the metal may be Cr(III), Ag(II), In(III), Mg(II), Mn(III), Sn(IV), Fe(III), or Zn(II). Metal complexes based on Cr(III), Ag(II), In(III), Mn(III), Sn(IV), Fe(III), or Zn(II) in particular have the advantage that they are not acid sensitive and provide more stable complexes since they will not lose the metal at pH<6.

In a particular embodiment, the colorants and colorless light-absorbing additives are UV-absorbers, i.e. they absorb UV light in the band below 380 nm. When the light absorbing additive is a UV-absorber, the resulting ophthalmic lens exhibits a UV-cut. By "UV-cut" it is meant the highest wavelength for which the transmittance is lower than 1% as measured according to the method described herein. Preferably, the UV absorber is chosen so that the ophthalmic lens obtained from the polymerizable composition of the present invention has a UV-cut of at least 380 nm.

According to a particular embodiment, the UV absorber included in the composition according to the present invention is a benzotriazole, a benzophenone, a triazine, an oxalanilide, and mixtures thereof.

In a particular embodiment, the colorants and colorless light-absorbing additives are Near Infra Red (NIR) absorbers, i.e. they absorb infra red light in the band from about 780 nm to about 1400 nm. Especially, semiquinones or dinuclear mixed-valence ruthenium complex are suitable NIR absorbers.

The amount of light-absorbing additive in the nanoparticles is from 0.0001 to 90 wt %, in particular 0.01 to 50% wt %, more particularly 0.1 to 10 wt % based on the weight of the nanoparticles.

According to the invention, the light-absorbing additive is encapsulated in nanoparticles that are dispersed in the composition according to the present invention, i.e. the light-absorbing additive is contained within or grafted on said nanoparticles.

Nanoparticles behave like reservoirs, in which light-absorbing additives are stored and protected. Light-absorbing additives may be homogenously dispersed in nanoparticles or localized in the core of nanoparticles. Light-absorbing additives may also be localized at the surface or inside the porosity of nanoparticles.

Indeed, active reactants from the composition according to the invention, i.e. radicals involved in radical polymerization, will not be able to diffuse in the internal part of nanoparticles. If light-absorbing additives are located on the surface or in porosity of nanoparticles, active reactants may reach them, but as mobility of grafted or trapped additives is hindered, probability of reaction is lowered and additives are also protected.

In the context of the present invention, the term "nanoparticles" is intended to mean individualized particles of any shape having a size, measured in its longest direction, in the range of 1 nm to 10 μm, preferably in the range of 10 nm to 5 μm, as measured by the Dynamic Light Scattering method disclosed herein.

The nanoparticles of the present invention are either polymer-based, i.e. they comprise a polymer, or mineral-based, i.e. they comprise a mineral oxide.

In a preferred embodiment, the polymer or mineral oxide comprised in the nanoparticles is a transparent material.

According to a first embodiment, the nanoparticles that are dispersed in the composition according to the present invention comprise a polymer.

Polymer-based nanoparticles can be of various types, such as for example latex nanoparticles, core shell nanoparticles, nanoparticles on which light absorbing additive are grafted, dendrimer nanoparticles, nanoparticles comprising a polymer having a melting point higher than 120° C. The polymer-based nanoparticle can further be coated with a protective layer.

Preferably said polymer-based nanoparticles comprise a polymer selected in the group consisting of an acrylic polymer, a vinylic polymer, an allylic polymer, and mixtures thereof.

Preferably, the polymer-based nanoparticles comprise an acrylic polymer, more preferably a copolymer of methyl methacrylate and ethyleneglycol dimethacrylate.

Polymer-based nanoparticles can be prepared by solvent evaporation, nanoprecipitation, emulsion polymerization, interfacial polymerization, spray drying and coacervation. Preferably, polymer-based nanoparticles are prepared by emulsion polymerization, such as miniemulsion or microemulsion polymerization.

Polymer-based nanoparticles containing a light-absorbing additive can be prepared by emulsion polymerization by mixing a solvent such as water; a light-absorbing additive, a monomer such as an acrylic monomer, a vinylic monomer, an allylic monomer and mixtures thereof; a mild catalyst such as an organic azo compound, a peroxodisulfate salt, a peroxyester or a perketal; at least one surfactant, preferably an ionic surfactant such as sodium dodecylsulfonate; and optionally a reticulating agent. The use of an ionic surfactant advantageously helps to avoid coalescence of the monomer droplets during polymerization and aggregation of the nanoparticles after polymerization due to ionic repulsion. The use of a mild catalyst advantageously prevents degradation of the light-absorbing additive that occurs with harsh catalysts such as peroxydicarbonates. The use of a reticulating agent advantageously densifies the nanoparticle thus preventing leakage of the light-adsorbing additive out of the nanoparticle and preventing the migration of a radical inside the nanoparticle during polymerization of the lens.

In some embodiments, the light absorbing additive is copolymerizable within the polymer-based nanoparticles. By "copolymerizable", it is meant that the light-absorbing additive contains a reactive group, such as an unsaturation or a functional group, said reactive group being able to establish a covalent link with the material used to prepare the polymer-based nanoparticles.

According to a second embodiment, the nanoparticles that are dispersed in the composition according to the present invention comprise a mineral oxide. Preferably said mineral-based nanoparticles comprise a mineral oxide selected in the group consisting of $SiO_2$, $TiO_2$, $ZrO_2$, $Al_2O_3$, and mixtures thereof.

Mineral-based nanoparticles can be prepared by Stöber synthesis or reverse microemulsion.

Silica nanoparticles containing a light-absorbing additive can be prepared by Stöber synthesis by mixing tetraethyl orthosilicate and the light-absorbing additive in an excess of water containing a low molar-mass alcohol such as ethanol and ammonia. In the Stöber approach, the light-absorbing additive must be functionalized so as to be able to establish a covalent link with silica, for example silylated with a conventional silane, preferably an alkoxysilane. Stöber synthesis advantageously yields monodisperse $SiO_2$ particles of controllable size.

Silica or Silica-Metal Oxide nanoparticles containing a light-absorbing additive can be prepared by reverse (water-in-oil) microemulsion by mixing an oil phase, such as cyclohexane and n-hexanol; water; a surfactant such as Triton X-100; a light absorbing additive, one or more mineral oxide precursors such as tetraethyl orthosilicate, titanium alkoxylate and aluminium alkoxide; and a pH adjusting agent such as sodium hydroxide. In the reverse micro-emulsion approach, a larger quantity of polar light-absorbing additives can be encapsulated in the mineral oxide matrix than those encapsulated with the Stöber synthesis: the encapsulation yield can be very high, thus avoiding the waste of expensive light-absorbing additive. Moreover, this method advantageously allows an easy control of particle size, especially in the case of reverse microemulsions. Additionally, this method enables the addition of $TiO_2$, $ZrO_2$ or $Al_2O_3$ in the silica nanoparticles.

Mineral-based nanoparticles obtained by Stöber synthesis and reverse (water-in-oil) microemulsion are highly reticulated and coated with hydrophobic silica groups thus preventing leakage of the light-adsorbing additive out of the nanoparticle and preventing the migration of a radical inside the nanoparticle during polymerization of the lens.

In a preferred embodiment, the refractive index of the nanoparticles is from 1.47 to 1.56, preferably the refractive index of the nanoparticles is identical to the refractive index of the polymerized monomer or oligomer, as measured according to the ISO 489:1999. Indeed, when the refractive index of the nanoparticles is close to that of the polymerized monomer or oligomer, the ophthalmic lens exhibits less light scattering and thus less reduction of light intensity and/or haze.

The refractive index of polymer-based nanoparticles depends on the type of monomer or monomer mixture that is used to prepare the nanoparticle. As such, the refractive index of an allylic nanoparticle is 1.5 and the refractive index of an acrylic or vinylic nanoparticle can be increased by copolymerizing the acrylic or vinylic monomer with a monomer containing an aromatic group.

The refractive index of mineral-based nanoparticles depends on the type of mineral oxide or mixture of mineral oxides that is used to prepare the nanoparticle. As such, the refractive index of a $SiO_2$ nanoparticle is 1.47-1.5 and the refractive index of a nanoparticle comprising a mixture of $SiO_2$ and $TiO_2$, a mixture of $SiO_2$ and $ZrO_2$, or a mixture of $SiO_2$ and $Al_2O_3$ can reach 1.56.

Advantageously, the nanoparticles exhibit a size of from 1 nm to 10 μm, preferably 10 nm to 5 μm, as measured according to the Dynamic Light Scattering method. Indeed, when the size of the nanoparticles is less than 10 μm, the ophthalmic lens exhibits less light scattering and thus less reduction of light intensity. Such nanoparticles can be directly obtained by micro-emulsion polymerization, or by reducing their size with a grinding step.

The amount of nanoparticles in the composition is from 0.01 to 2 wt %, preferably 0.05 to 1 wt % based on the weight of the composition.

Process for Preparing a Liquid Polymerizable Composition and an Ophthalmic Lens

The process carried out for preparing the ophthalmic lens according to the invention, comprises the steps of:

a) providing monomers or oligomers from which the matrix can be prepared;

b) preparing nanoparticles encapsulating a light-absorbing additive either in the form of a powder which is dispersible within the monomers or oligomers or in the form of a dispersion of nanoparticles in a liquid which is dispersible within the monomers or oligomers;

c) providing a catalyst for initiating the polymerization of said monomers or oligomers;

d) mixing the monomers or oligomers, the nanoparticles and the catalyst so as to obtain a polymerizable liquid composition in which nanoparticles are dispersed;

e) optionally depositing the polymerizable liquid composition on a substrate;
f) curing the polymerizable liquid composition.

Preferably, the curing is a thermal curing.

As used herein, a coating that is said to be deposited on a surface of a substrate is defined as a coating, which (i) is positioned above the substrate, (ii) is not necessarily in contact with the substrate, that is to say one or more intermediate layers may be arranged between the substrate and the layer in question, and (iii) does not necessarily completely cover the substrate.

A coating may be deposited or formed through various methods, including wet processing, gaseous processing, and film transfer.

According to a preferred embodiment, the composition may be stirred until homogeneous and subsequently degassed and/or filtered before curing.

According to a preferred embodiment, when nanoparticles are provided in the form of a dispersion in a liquid, wherein the dispersing liquid is a dispersible within monomer or oligomer, in particular, the dispersing liquid is the monomer or oligomer used for generating the matrix according to the invention.

The polymerizable composition of the present invention described above may be cast into a casting mold for forming a lens and polymerized by heating at a temperature of from 40 to 130° C., in particular from 75° C. to 105° C. or in particular from 100° C. to 150° C. or in particular from 45 to 95° C. According to a preferred embodiment, the heating may last for 5 to 24 hours, preferably 7 to 22 hours, more preferably 15 to 20 hours.

The casting mold may then be disassembled and the lens may be cleaned with water, ethanol or isopropanol.

The ophthalmic lens may then be coated with one or more functional coatings selected from the group consisting of an anti-abrasion coating, an anti-reflection coating, an antifouling coating, an antistatic coating, an anti-fog coating, a polarizing coating, a tinted coating and a photochromic coating.

The ophthalmic lens is herein defined as a lens which is designed to fit a spectacles frame so as to protect the eye and/or correct the sight. Said ophthalmic lens can be an uncorrective ophthalmic lens (also called piano or afocal lens) or a corrective ophthalmic lens. Corrective lens may be a unifocal, a bifocal, a trifocal or a progressive lens.

Use of a Light-Absorbing Additive Contained in Nanoparticles

The present invention also pertains to the use of a light-absorbing additive contained in nanoparticles for preventing the degradation of said light-absorbing additive by a catalyst for initiating polymerization of a monomer or oligomer. The prevention of the degradation of the light-absorbing additive by the catalyst can be assessed by comparing the absorption spectrum of the composition prior to polymerization with that of the ophthalmic lens after polymerization. If the absorption spectra show the same transmittance reduction for the maximum absorption wavelength of the light-absorbing additive, it can be assumed that the light-absorbing additive is not degraded by the catalyst during polymerization.

According to a preferred embodiment, the use of a light-absorbing additive contained in nanoparticles prevents yellowing of the cured ophthalmic lens. Indeed, degradation of the light-absorbing additive by the catalyst during polymerization generates degradation product that result in undesirable yellowing of the lens. The yellowness index (YI) of the cured ophthalmic lens can be measured according to ASTM D-1925.

The invention will now be described in more detail with the following examples which are given for purely illustrative purposes and which are not intended to limit the scope of the invention in any manner.

EXAMPLES

FIGURES

MEASURING METHODS

Figure 1:
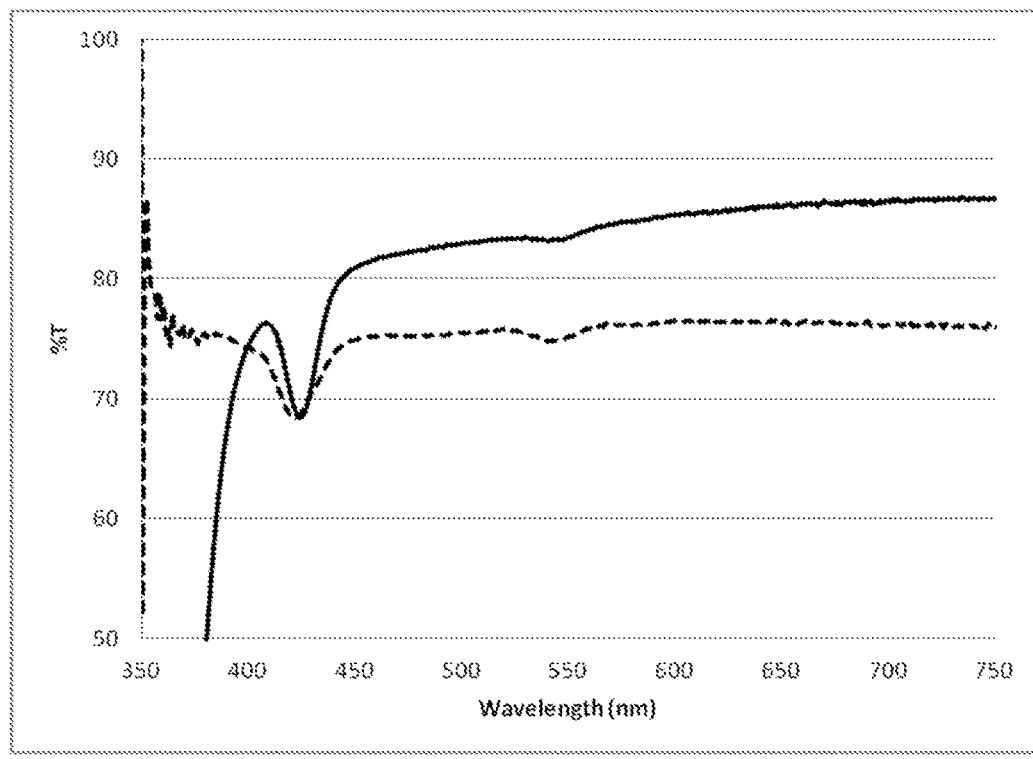
FIG. 1 is a graph of transmittance as a function of wavelength for a composition comprising a light-absorbing additive (OMNISTAB™ 47, wavelength of maximum absorption at 424 nm) in polymer-based nanoparticles prior to polymerization (dotted line) and after polymerization (solid line).

The following measures are carried out on a lens that is 2 mm thick in its center and that has been cleaned with isopropyl alcohol.

The average (or mean) light transmittance over 420-450 nm range (TB %) is computed from transmittance curve measured according to ISO 8980-3-2003.

The size of the nanoparticles is measured by standard Dynamic Light Scattering method. The technique measures the time-dependent fluctuations in the intensity of scattered light from a suspension of nanoparticles undergoing random Brownian motion. Analysis of these intensity fluctuations allows for the determination of the diffusion coefficients, which, using the Stokes-Einstein relationship can be expressed as the particle size.

Haze value is measured by light transmission measurement using the Haze-Guard Plus© haze meter from BYK-Gardner (a color difference meter) according to the method of ASTM D1003-00. All references to "haze" values in this application are by this standard. The instrument is first calibrated according to the manufacturer's instructions. Next, the sample is placed on the transmission light beam of the pre-calibrated meter and the haze value is recorded from three different specimen locations and averaged.

Colorimetric coefficients of the lenses of the invention are measured according to the international colorimetric system CIE L*a*b*, i.e. calculated between 380 and 780 nm, taking the standard illuminant D 65 at angle of incidence 150 and the observer into account (angle of 10°).

Materials

In the examples, the following compounds are used:

| Component | CAS number | Function |
|---|---|---|
| CR-39 ® | 142-22-3 | allyl monomer |
| CR-39E ® | Proprietary | allyl monomer (as disclosed in U.S. Pat. No. 7,214,754) |
| IPP | 105-64-6 | catalyst |
| SK-1.60 Optical Resin Monomer (Supplier Jiangsu Shikexincai Co., Ltd.) | Proprietary | Composition comprising: epoxy acrylate styrene Corresponding to Acrylic monomer. |

-continued

| Component | CAS number | Function |
|---|---|---|
| 2,2'-Azodi-(2-methylbutyronitrile) | 13472-08-7 | catalyst |
| 2,5(or 2,6)-bis(isocyanatomethyl)-Bicyclo[2.2.1]heptane | 74091-64-8 | Isocyanate monomer |
| Pentaerythritol tetrakis mercaptopropionate | 7575-23-7 | Thiol monomer |
| 4-Mercaptomethyl-3,6-dithia-1,8-octanedithiol | 131538-00-6 | Thiol monomer |
| Dimethyl Chloride (DMC) | 753-73-1 | catalyst |
| methyl methacrylate | 80-62-6 | monomer to prepare polymer-based nanoparticles |
| ethylene glycol dimethacrylate | 97-90-5 | reticulating agent to prepare polymer-based nanoparticles |
| 2,2'-Azobis(2,4-dimethylvaleronitrile) (AIVN) | 4419-11-8 | catalyst |
| tetraethyl orthosilicate (TEOS) | 78-10-4 | precursor for mineral-based nanoparticles |
| tetrabutyl orthotitanate (TBOT) | 5593-70-4 | precursor for high index mineral-based nanoparticles |
| sodium dodecylsulfate (SDS) | 151-21-3 | ionic surfactant |
| Triton X-100 | 9002-93-1 | surfactant |
| Zelec-UN (Supplier Mitsui Chemical) | Proprietary | Demolding agent |

Example 1: Preparation of Polymer-Based Nanoparticles Containing a Light-Absorbing Additive by Miniemulsion Polymerization A monomer blend (5 g) is prepared from methyl methacrylate and ethylene glycol dimethacrylate in a weight ratio of 50:50, and OMNISTAB™47 (10 mg, available from Deltachem Co. Ltd.) is dissolved in this monomer blend. This blend is added dropwise to 50 ml of an aqueous solution containing SDS (0.5 g) and AIVN (0.05 g) at 80° C. under a nitrogen atmosphere. After completion of the monomer blend addition, the mixture is then further mixed for additional 2 h at 80° C., then centrifuged, washed with ethanol, and dried. The nanoparticles have a size in the range of 200 nm to 1000 nm and a refractive index of 1.5.

The nanoparticles are dispersed in CR39® (12.5 weight % nanoparticles in monomer) to prepare a masterbatch (Master 1).

Example 2: Preparation of Mineral-Based Nanoparticles Containing a Light-Absorbing Additive by Reverse Microemulsion, with Refractive Index Around 1.47

Ex. 2a: A mixture of cyclohexane (7.5 ml), n-hexanol (1.8 ml), Triton X-100 (1.5 g), OMNISTAB™47 (40 mg, available from Deltachem Co; Ltd), TEOS (0.1 ml) and ammonium hydroxide 30% (0.06 ml) are mixed for 24 h. Then, acetone is added and the particles are collected by centrifugation, washed with ethanol and dried. The nanoparticles have a monodisperse size centered on 100 nm and a refractive index corresponding to precipitated silica, around 1.47.

The nanoparticles are dispersed in CR-39® (12.5 weight % nanoparticles in monomer) to prepare a masterbatch (Master 2a).

Ex. 2b: 7.56 g of Triton X-100, 5.86 g hexan-1-ol, 23.46 g cyclohexane, 1.6 ml deionized water, 0.32 ml of methylene blue solution (CAS: 61-73-4, 1% weight solution in water) which is the light-absorbing additive, 0.4 ml of TEOS, and 0.24 ml of 30% ammonium hydroxide solution in water are mixed and stirred at room temperature for 24 h.

After 24 h, one volume of acetone (around 50 ml) is added to the obtained solution, and the particles are collected by centrifugation, washed with acetone or water, dried overnight at room temperature, and annealed in an oven at 80° C. for 3 hours.

0.2 g of the obtained dried mineral nanoparticles are then redispersed under magnetic stirring in approx. 20 ml acetone and zirconium beads having size of 1 mm as grinding agents. The mixture is finally filtered to remove zirconium beads. 99.8 g of CR-39® is then added and the acetone is stripped out under vacuum so as to obtain a masterbatch (Master 2b).

Ex. 2c: 7.56 g of Triton X-100, 30 ml of hexan-1-ol, 7.2 ml of cyclohexane, 1.6 ml deionized water, 0.32 ml of methylene blue solution (CAS: 61-73-4, 1% weight solution in water) which is the light-absorbing additive, 0.4 ml of TEOS, and 0.24 ml of 30% ammonium hydroxide solution in water are mixed and stirred at room temperature for 24 h.

After 24 h, one volume of acetone (around 50 ml) is added to the obtained solution, and the particles are collected by centrifugation, washed with acetone or water, dried overnight at room temperature. The nanoparticles have a monodisperse size of 100 nm and a refractive index corresponding to precipitated silica, around 1.47.

Nanoparticles are dispersed in CR-39® as in example 2b, to prepare a masterbatch (Master 2c).

Ex. 2d: Ex. 2c was reproduced (Master 2d), except that 1.76 ml of deionized water was used instead of 1.6 ml and 7.4 g of Triton X-100 instead of 7.54 g. The nanoparticles have a monodisperse size of 80 nm.

Ex. 2e: Ex. 2c was reproduced (Master 2e), except that 2.16 ml of deionized water was used instead of 1.6 ml and 7 g of Triton X-100 instead of 7.54 g. The nanoparticles have a monodisperse size of 50 nm.

Examples 2c to 2e show that the ratio between deionized water and Triton X-100 defines the final size of nanoparticles: the higher the ratio, the smaller the nanoparticles.

Ex. 2f: Ex. 2c was reproduced (Master 2f), except that 1.44 ml of deionized water was used instead of 1.6 ml and 7 g of Triton X-100 instead of 7.54 g. Further, 0.16 ml of 5,10,15,20-Tetrakis(4-sulfonatophenyl)-porphine-Cu(II) (TSPP-Cu(II)) solution (0.01M in deionized water) was added. The nanoparticles have a monodisperse size of 100 nm.

Other light absorbing agents have been used with the same preparation procedure, as summarized in the table A below.

TABLE A
| Color Index number (C.I.) | Molecule |
|---|---|
| 60730<br>Acid Violet 43 | 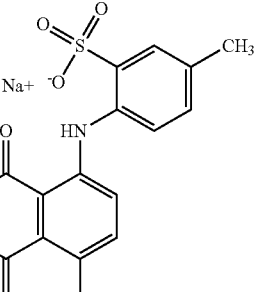 |
| 42090<br>Acid Blue 9 | 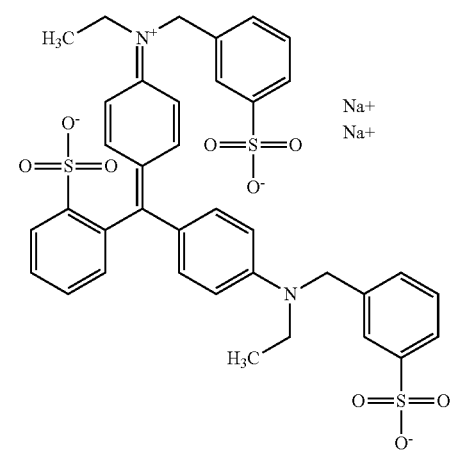 [SMILES: CCN(Cc1cccc(S(=O)(=O)[O-])c1)c1ccc(C(=C2C=CC(=[N+](CC)Cc3cccc(S(=O)(=O)[O-])c3)C=C2)c2ccccc2S(=O)(=O)[O-])cc1 ; [Na+] ; [Na+]] |
| 42051<br>Acid Blue 3<br>(Patent Blue V) | 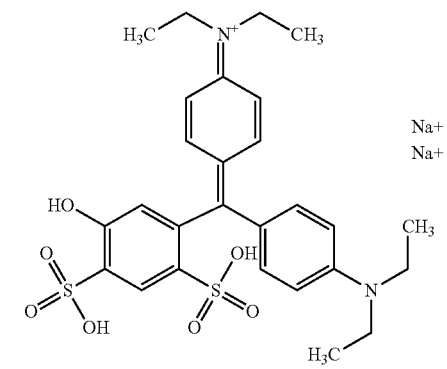 [SMILES: CCN(CC)c1ccc(C(=C2C=CC(=[N+](CC)CC)C=C2)c2cc(O)c(S(=O)(=O)O)cc2S(=O)(=O)O)cc1 ; [Na+] ; [Na+]] |
| 74180<br>Solvent Blue 38<br>(for microscopy<br>Luxol ® Fast<br>Blue MBSN) | 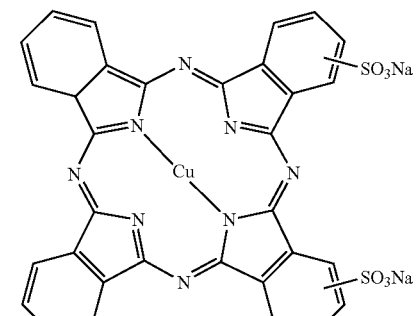 |

TABLE A-continued

| Color Index number (C.I.) | Molecule |
|---|---|
| 20470 Acid Black 1 | (structure) |
| 42045 Acid Blue 1 | (structure) |
| TSPP-Cu(II) | (structure) |

Example 3: Preparation of Mineral-Based Nanoparticles Containing a Light-Absorbing Additive by Reverse Microemulsion, with Refractive Index Higher than 1.5

Ex. 3a: Nanoparticles obtained in example 2c are introduced in an aqueous solution of 36.5% in weight of tetrabutyl orthotitanate (TBOT).

1 g of nanoparticle obtained in example 2b is dispersed in 25 ml of 20 vol water: 1 vol ethanol mixture. Then 1.85 ml of HCl (37% weight solution in water) is added in the mixture. The reaction is stirred by magnetic bar for 15 min. After that, 9.1 g of tetrabutyl orthotitanate (TBOT) is added dropwise and mixture is continuously stirred for 3 h at room temperature.

A thin layer of titania is deposited on the silica based nanoparticles, yielding core shell nanoparticles. These nanoparticles are washed with ethanol, dried at room temperature then annealed at 180° C. for 2 h and have a monodisperse size of 100 nm with a refractive index around 1.54.

A masterbatch is prepared (Master 3a) as for example 2b, but using SK-1.60 Optical Resin Monomer as an acrylic monomer instead of CR-39®.

Ex. 3b: Ex. 3a is reproduced, except that 15.0 g of TBOT is added. Nanoparticles have a monodisperse size of 100 nm with a refractive index higher than 1.55.

A masterbatch is prepared (Master 3b) as for example 2b, but using 4-Mercaptomethyl-3,6-dithia-1,8-octanedithiol instead of CR-39®.

Example 4: Preparation of Mineral-Based Nanoparticles Containing a Light-Absorbing Additive by Stöber Process, with Refractive Index Around 1.47

384 mL of methanol is added in 1000 ml bottle. Then, 96 ml of NH$_4$OH (30% weight solution in water) and 6.4 mL of methylene blue (CAS: 61-73-4, 2% weight solution in deionized water) are added. The mixture is stirred (magnetic stirring) at 400 rpm for 10 min. After that, 3.2 ml of TEOS is added dropwise and stirred at 800 rpm for 2 h.

After reaction is complete, particle size is checked by Dynamic Light Scattering. The average particle size is around 200-230 nm (mono-disperse).

Mixture is transferred to round bottle flask for evaporating 1 h in order to reduce the volume of methanol from 500 to 100 ml, then, centrifuged at 4000 rpm for 45 min. Supernatant is removed and nanoparticles are retrieved as concentrated dispersion in methanol.

Mixture is then cleaned two times with the following procedure: 50 ml of methanol is added with sonication to re-disperse particle. Nanoparticle are collected by centrifugation at 4000 rpm for 30 min.

Nanoparticles are air dried at ambient temperature overnight, then grinded in an agathe mortar. Then nanoparticles are annealed at 180° C. for 2 hours. 0.3 g of nanoparticle is mixed with 99.7 g of CR-39® monomer in 250 ml bottle. The master-batch is sonicated for 30 min. Centrifugation at 4000 rpm for 30 min is applied to remove the agglomerated particle. The supernatant is collected to obtain a masterbatch (Master 4).

Example 5: Preparation of Mineral-Based Nanoparticles Containing a Light-Absorbing Additive by Stöber Process, with Refractive Index Higher than 1.5

Nanoparticles obtained in example 4 are introduced in an aqueous solution of 36.5% in weight of tetrabutyl orthotitanate (TBOT).

1 g of nanoparticle obtained in example 4 is dispersed in 25 ml of 20 vol water:1 vol ethanol mixture. Then 1.85 ml of HCl (37% weight solution in water) is added in the mixture. The reaction is stirred by magnetic bar for 15 min. After that, 9.1 g of tetrabutyl orthotitanate (TBOT) is added dropwise and mixture is continuously stirred for 3 h at room temperature.

A thin layer of titania is deposited on the silica based nanoparticles, yielding core shell nanoparticles. These nanoparticles are washed with ethanol, dried at room temperature then annealed at 180° C. for 2 h and have a monodisperse size of 200-230 nm with a refractive index around 1.54.

A masterbatch is prepared (Master 5) as for example 4, but using but using SK-1.60 Optical Resin Monomer as an acrylic monomer instead of CR-39®.

Example 6: Preparation of a Ophthalmic Lenses According to the Invention

Ex. 6a:

TABLE 1

| Material | Parts by weight |
| --- | --- |
| CR39 ® | 95.00 |
| CR39E ® | 2.00 |
| Master 1 or 2a-f or 4 | 2.00 |
| IPP | 2.40 |

The monomer blend is manufactured by weighing and mixing the ingredients of table 1 in a beaker at room temperature. CR39® and CR39E® are first mixed. Once homogeneous, nanoparticles in masterbatch are added then the beaker content is mixed again until full dispersion. Finally, IPP is added and the mixture is stirred thoroughly, then degassed and filtered.

A 71 mm diameter glass bi-plano mold was then filled with the composition using a syringe and the polymerization was carried out in a regulated electronic oven in which the temperature was gradually increased from 45° C. to 85° C. in 15 hours then kept constant at 85° C. for 5 hours. The mold was then disassembled and the resulting lens had a 2 mm thickness in its center.

As shown in FIG. 1, the transmission spectrum of the composition comprising Master 1 before polymerization and the transmission spectrum of the lens after polymerization show the same transmittance reduction for the maximum absorption wavelength of the light-absorbing additive (424 nm). As such, in the ophthalmic lens according to the present invention the dye has not been degraded by the IPP catalyst during polymerization. Differences in both spectra outside the absorption domain of the light-absorbing additive are obviously linked to the chemical transformation occurring during polymerization (catalyst dissociation, reaction of unsaturated groups . . . ).

Figure 2:
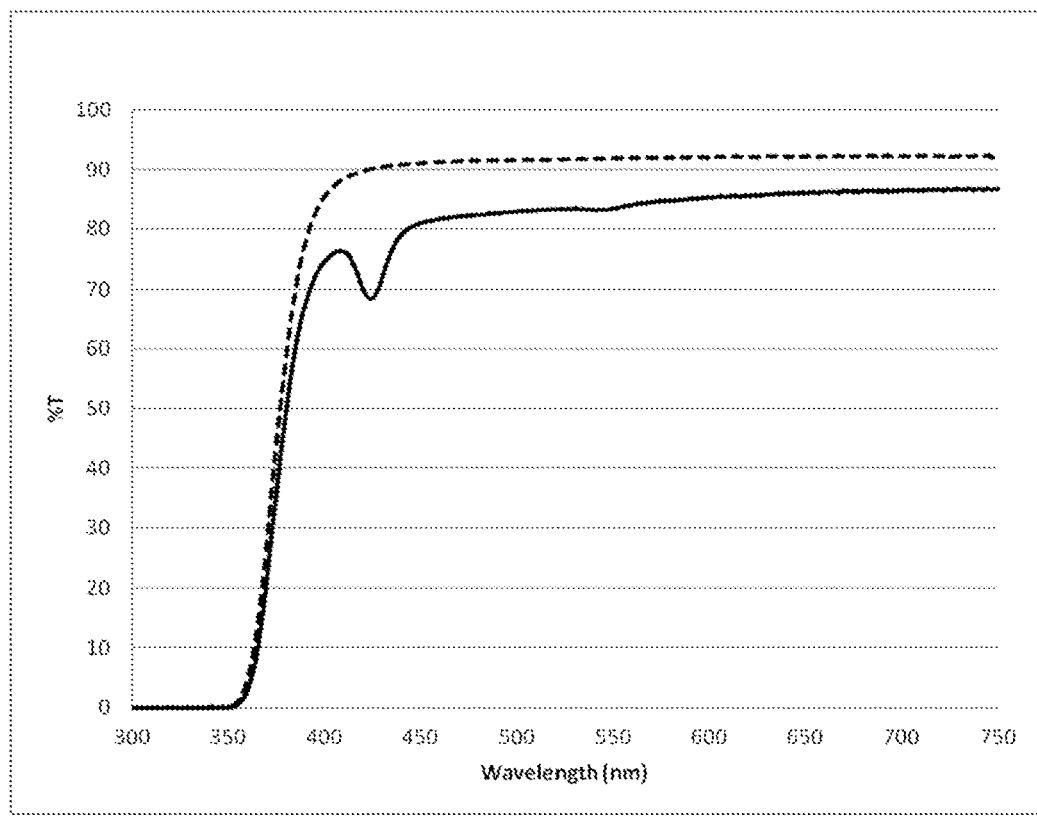
FIG. 2 is a graph of transmittance as a function of wavelength for a lens with a non-encapsulated light-absorbing additive (dotted line) and a light-absorbing additive encapsulated in polymer-based nanoparticles (solid line).

As shown in FIG. 2, the resulting ophthalmic lens has an average transmittance TB % of 77% in the range of 420 nm to 450 nm. In comparison, the same ophthalmic lens comprising non-encapsulated dye has an average transmittance TB % of 91%. As such, the ophthalmic lens comprising an encapsulated dye according to the present invention exhibits a better absorption of blue light than the corresponding ophthalmic lens comprising a non-encapsulated dye.

The effects of methylene blue as the light absorbing additive, on haze (light diffusion), particle size and residual color of the lens (as measured by b* according to CIE Lab model) were evaluated with various nanoparticles. Conditions of Example 2b are reproduced, except that the concentration of methylene blue aqueous solution is varied between 0.4% and 1% by increments of 0.2%, yielding nanoparticles with different concentrations of methylene blue.

The increase of methylene blue concentration in nanoparticles showed a positive trend on haze, because less particles were required to obtain the same colouring effect. With particles obtained with 1% methylene blue solution, average transmittance TB % is decreased from 0.5 to 0.3 compared to the particles obtained with 0.4% methylene blue solution, without degrading haze performance.

Increasing the methylene blue concentration also led to an increase in particle size: at 0.4%, the measured particle size was around 80 nm, whereas it was around 90 nm at 0.6%, and 95 nm at both 0.8% and 1%.

Measurements also showed that the haze generated by deionized water washed nanoparticles is around 20-40% lower than that of acetone washed nanoparticles, for a similar residual color (measured by b* reduction in Lab system).

Ex. 6b:

TABLE 2

| Material | Parts by weight |
|---|---|
| SK-1.60 Optical Resin Monomer | 95.78 |
| Zelec UN | 0.1 |
| Master 3a or 5 | 4.00 |
| 2,2'-Azodi-(2-methylbutyronitrile) | 0.12 |

The monomer blend is manufactured by weighing and mixing the ingredients of table 2 in a beaker at room temperature. Once homogeneous, mixture is degassed and filtered.

A bi-plano mold with 71 mm of diameter is filled with monomer mixture by using syringe.

The polymerization is conducted in a regulated electronic oven in which the temperature is gradually increased from 25° C. to 95° C. in 16.5 hours then kept constant at 95° C. for 2 hours. The mold is then disassembled and the clear lens with a 2 mm center thickness is obtained.

Ex. 6c:

TABLE 3

| Material | Parts by weight |
|---|---|
| 2,5(or 2,6)-bis(iso-cyanatomethyl)-Bicyclo[2.2.1]heptane | 50.54 |
| Pentaerythritol tetrakis mercaptopropionate | 23.87 |
| 4-Mercaptomethyl-3,6-dithia-1,8-octanedithiol | 23.47 |
| Master 3b | 4.00 |
| Dimethyl Chloride (DMC) | 0.04 |
| Zelec-UN | 0.07 |

The monomer blend is manufactured by weighing and mixing the ingredients of table 3 in the following manner.

2, 5(or 2, 6)-bis(iso-cyanatomethyl)-Bicyclo[2.2.1]heptane, DMC, and Zelec UN® are first mixed at room temperature under vacuum for 1 h. Once homogeneous, the mixture is cooled down to 5° C. then $N_2$ gas is transferred inside bottle to release vacuum. After that, Pentaerythritol tetrakis mercaptopropionate, 4-Mercaptomethyl-3,6-dithia-1,8-octanedithiol and Master 3b are added then the mixture is stirred until full dispersion under vacuum at 5° C. The vacuum is released by $N_2$ replacement.

A bi-plano mold with 71 mm of diameter is filled with monomer mixture by using syringe. The polymerization cycle starts at 15° C. and then temperature is gradually increased to 130° C. in 16 hours and kept constant for 3 h. The mold is then disassembled and the clear lens with a 2 mm center thickness is obtained.

The invention claimed is:

1. An ophthalmic lens comprising a composite substrate comprising:
   a matrix obtained by polymerization of at least one allyl or non-allyl monomer or oligomer in presence of a catalyst for initiating the polymerization of said monomer or oligomer; and
   nanoparticles containing at least one light absorbing additive, said nanoparticles being such that active reactants involved in the polymerization of the matrix are not able to diffuse to the internal part of the nanoparticles and said nanoparticles being dispersed in said matrix wherein:
   the nanoparticles encapsulate a light-absorbing additive; and
   the light-absorbing additive is not a photochromic dye.

2. The ophthalmic lens according to claim 1, wherein the matrix is chosen from a thermoplastic resin or a thermosetting resin and combinations thereof.

3. The ophthalmic lens according to claim 1, wherein the light-absorbing additive is chosen from a colorant, a colorless light-absorbing additive or mixtures thereof.

4. The ophthalmic lens according to claim 1, wherein the molar absorption coefficient of the light-absorbing additive is higher than 5000.

5. The ophthalmic lens according to claim 1 wherein the nanoparticles have a homogeneous composition from inside to outside in which the light-absorbing additive is uniformly distributed.

6. The ophthalmic lens according to claim 1, wherein the nanoparticles have a core containing the light-absorbing additive and a shell surrounding the core.

7. The ophthalmic lens according to claim 1, wherein the nanoparticles present an outer surface which does not comprise any organic compound.

8. The ophthalmic lens according to claim 1, wherein the nanoparticles comprise at least one mineral oxide.

9. The ophthalmic lens according to claim 1, wherein the refractive index of the nanoparticles is from 1.47 to 1.74, as measured according to the ISO 489:1999.

10. The ophthalmic lens according to claim 1, wherein the size of the nanoparticles is from 1 nm to 10 μm, as measured according to the Dynamic Light Scattering method.

11. The ophthalmic lens according to claim 1, wherein the amount of light-absorbing additive in the nanoparticles is from 0.0001 to 90 wt % based on the total weight of the nanoparticles.

12. The ophthalmic lens according to claim 1, wherein the amount of nanoparticles in the polymer matrix is from 0.01 to 2 wt % based on the weight of the polymer matrix.

13. A process for preparing the ophthalmic lens according to claim 1, comprising the steps of:
   a) providing monomers or oligomers from which the matrix can be prepared;
   b) preparing nanoparticles encapsulating a light-absorbing additive either in the form of a powder which is dispersible within the monomers or oligomers or in the form of a dispersion of nanoparticles in a liquid which is dispersible within the monomers or oligomers;
   c) providing a catalyst for initiating the polymerization of said monomers or oligomers;
   d) mixing the monomers or oligomers, the nanoparticles and the catalyst so as to obtain a polymerizable liquid composition in which nanoparticles are dispersed; and
   e) curing the polymerizable liquid composition.

14. The process according to claim 13, further comprising depositing the polymerizable liquid composition on a substrate prior to curing the polymerizable liquid composition.

* * * * *

UNITED STATES PATENT AND TRADEMARK OFFICE
CERTIFICATE OF CORRECTION

| | |
|---|---|
| PATENT NO. | : 11,204,445 B2 |
| APPLICATION NO. | : 16/323971 |
| DATED | : December 21, 2021 |
| INVENTOR(S) | : Pierre Fromentin et al. |

It is certified that error appears in the above-identified patent and that said Letters Patent is hereby corrected as shown below:

On the Title Page

(72) Inventors:
Delete "Waranya Phompan" and replace with -- Waranya Phomphan --.

Signed and Sealed this
Eleventh Day of October, 2022

Katherine Kelly Vidal
*Director of the United States Patent and Trademark Office*